United States Patent
Mizuno et al.

(10) Patent No.: US 10,871,773 B2
(45) Date of Patent: Dec. 22, 2020

(54) VEHICLE TRAVEL CONTROL APPARATUS

(71) Applicant: Honda Motor Co., Ltd., Tokyo (JP)

(72) Inventors: Toshiyuki Mizuno, Wako (JP); Akira Kito, Wako (JP); Yoshiaki Konishi, Wako (JP); Takayuki Kishi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 136 days.

(21) Appl. No.: 16/245,211

(22) Filed: Jan. 10, 2019

(65) Prior Publication Data

US 2019/0220008 A1 Jul. 18, 2019

(30) Foreign Application Priority Data

Jan. 15, 2018 (JP) ................................ 2018-004384

(51) Int. Cl.
  *G01C 22/00* (2006.01)
  *G05D 1/00* (2006.01)
  *B60W 40/09* (2012.01)
  *B60W 40/06* (2012.01)
  *G06F 7/00* (2006.01)

(52) U.S. Cl.
  CPC ........... *G05D 1/0061* (2013.01); *B60W 40/06* (2013.01); *B60W 40/09* (2013.01); *G05D 1/0088* (2013.01); *G05D 2201/0213* (2013.01)

(58) Field of Classification Search
  CPC .. G05D 1/0061; G05D 1/0088; G05D 1/0219; B60W 40/06; B60W 40/09; B60W 40/08; B60W 10/06; B60W 10/189; B60W 10/20
  USPC ................................................ 701/23, 25, 69
  See application file for complete search history.

(56) References Cited

U.S. PATENT DOCUMENTS

| 10,274,962 B2 | 4/2019 | Sekijima | |
|---|---|---|---|
| 2012/0253622 A1* | 10/2012 | Handa | B60K 23/0808 |
| | | | 701/69 |
| 2017/0235311 A1* | 8/2017 | Sekijima | B60W 50/14 |
| | | | 701/25 |
| 2018/0148036 A1* | 5/2018 | Gaither | B60W 30/1882 |

(Continued)

FOREIGN PATENT DOCUMENTS

| CA | 3025643 A1 | 11/2017 |
|---|---|---|
| JP | 2002331851 A | 11/2002 |
| JP | 2017121874 A | 7/2017 |

(Continued)

*Primary Examiner* — Mahmoud S Ismail
(74) *Attorney, Agent, or Firm* — Duft & Bornsen, PC (57) ABSTRACT

A vehicle travel control apparatus including a road surface condition detector, a drive mode instruction switch instructing a manual drive mode or a self-drive mode and, an electric control unit having a microprocessor and a memory. The memory stores a driving characteristic of a driver during traveling in the self-drive mode, and the microprocessor performs generating an action plan including a target path of the vehicle, controlling an actuator so that the vehicle travels in self-driving in accordance with the action plan, and the generating including restricting a target value of a physical quantity for traveling of the vehicle included in the action plan, based on the detected road surface condition and the driving characteristic stored in the memory, when a switching from the manual drive mode to the self-drive mode is instructed by the drive mode instruction switch.

16 Claims, 8 Drawing Sheets

(56) References Cited

U.S. PATENT DOCUMENTS

2019/0171204 A1\* 6/2019 Jang .................... G05D 1/0061

FOREIGN PATENT DOCUMENTS

| JP | 2017144776 A | 8/2017 |
| --- | --- | --- |
| WO | 2017203694 A1 | 11/2017 |

\* cited by examiner

VEHICLE TRAVEL CONTROL APPARATUS

CROSS-REFERENCE TO RELATED APPLICATION

This application is based upon and claims the benefit of priority from Japanese Patent Application No. 2018-004384 filed on Jan. 15, 2018, the content of which is incorporated herein by reference.

BACKGROUND OF THE INVENTION

Field of the Invention

This invention relates to a vehicle travel control apparatus configured to self-drive a vehicle in a manner dependent on road surface condition.

Description of the Related Art

Conventionally, an apparatus is known that self-drives a vehicle while taking road surface into consideration. An apparatus of this type described in Japanese Unexamined Patent Publication No. 2017-121874 (JP2017-121874A), for example, estimates road surface friction coefficient from vehicle behavior, generates a travel plan that makes turning acceleration smaller when estimated friction coefficient is smaller than a predetermined value than when it is larger than the predetermined value. Traveling of the associated vehicle is controlled based on this travel plan.

However, in a case where, for example, manual driving switches to self-driving and self-driving is thereafter performed in accordance with road surface condition, passengers (including driver) experience a considerably odd sensation when divergence between vehicle behavior during self-driving and vehicle behavior during manual driving is great.

SUMMARY OF THE INVENTION

An aspect of the present invention is a vehicle travel control apparatus configured to control a travel behavior of a vehicle including an actuator for traveling. The vehicle is configured to travel in a self-drive mode with a self-drive capability enabled and in a manual drive mode with the self-drive capability disabled. The vehicle control apparatus includes a road surface condition detector configured to detect a road surface condition, a drive mode instruction switch configured to instruct the manual drive mode or the self-drive mode, and an electric control unit having a microprocessor and a memory. The memory is configured to store a driving characteristic of a driver during traveling in the self-drive mode. The microprocessor is configured to perform: generating an action plan including a target path of the vehicle; controlling the actuator so that the vehicle travels in self-driving in accordance with the action plan generated in the generating; and the generating including restricting a target value of a physical quantity for traveling of the vehicle included in the action plan, based on the road surface condition detected by the road surface condition detector and the driving characteristic stored in the memory, when a switching from the manual drive mode to the self-drive mode is instructed by the drive mode instruction switch.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
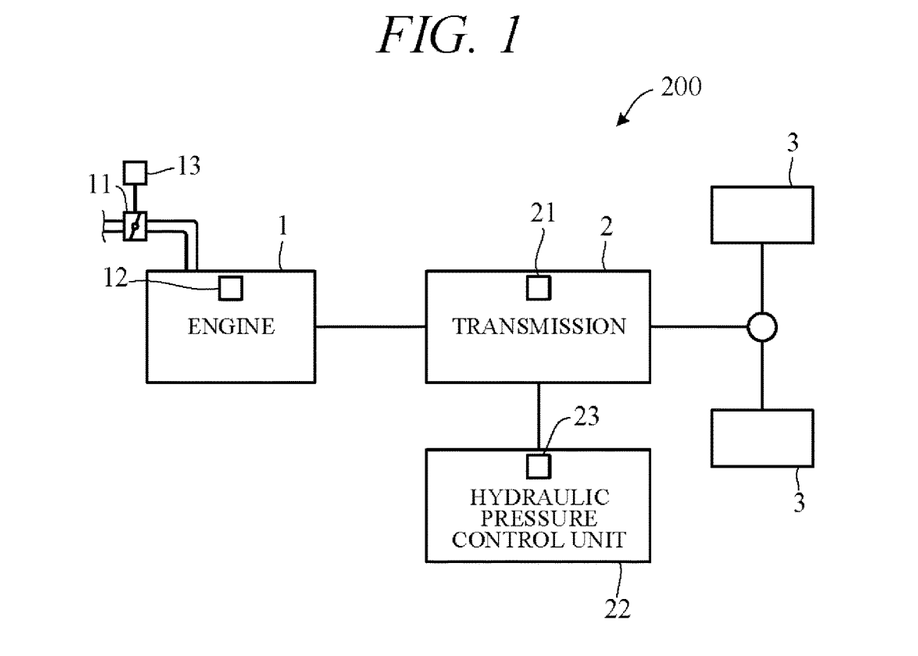
FIG. 1 is a diagram showing a configuration overview of a driving system of a self-driving vehicle to which a vehicle travel control apparatus according to an embodiment of the present invention is applied.

Hereinafter, an embodiment of the present invention is explained with reference to FIGS. 1 to 9. A vehicle travel control apparatus according to an embodiment of the present invention is applied to a vehicle (self-driving vehicle) having a self-driving capability. FIG. 1 is a diagram showing a configuration overview of a driving system of a self-driving vehicle 200 incorporating a travel control apparatus according to the present embodiment. Herein, the self-driving vehicle may be sometimes called subject vehicle to differentiate it from other vehicles. The vehicle 200 is not limited to driving in a self-drive mode requiring no driver driving operations but is also capable of driving in a manual drive mode by driver operations.

As shown in FIG. 1, the vehicle 200 includes an engine 1 and a transmission 2. The engine 1 is an internal combustion engine (e.g., gasoline engine) wherein intake air supplied through a throttle valve and fuel injected from an injector are mixed at an appropriate ratio and thereafter ignited by a sparkplug or the like to burn explosively and thereby generate rotational power. A diesel engine or any of various other types of engine can be used instead of a gasoline engine. Air intake volume is metered by the throttle valve. An opening angle of the throttle valve 11 (throttle opening angle) is changed by a throttle actuator 13 operated by an electric signal. The opening angle of the throttle valve 11 and an amount of fuel injected from the injector 12 (injection timing and injection time) are controlled by a controller 40 (FIG. 2).

The transmission 2, which is installed in a power transmission path between the engine 1 and drive wheels 3, varies speed ratio of rotation of from the engine 1, and converts and outputs torque from the engine 1. The rotation of speed converted by the transmission 2 is transmitted to the drive wheels 3, thereby propelling the vehicle 200. Optionally, the vehicle 200 can be configured as an electric vehicle or hybrid vehicle by providing a drive motor as a drive power source in place of or in addition to the engine 1.

The transmission 2 is, for example, a stepped transmission enabling stepwise speed ratio (gear ratio) shifting in accordance with multiple (e.g. six) speed stages. Optionally, a continuously variable transmission enabling stepless speed ratio shifting can be used as the transmission 2. Although omitted in the drawings, power from the engine 1 can be input to the transmission 2 through a torque converter. The transmission 2 can, for example, incorporate a dog clutch, friction clutch or other engaging element 21. A hydraulic pressure control unit 22 can shift speed stage of the transmission 2 by controlling flow of oil to the engaging element 21. The hydraulic pressure control unit 22 includes a solenoid valve or other valve mechanism operated by electric signals (called "shift actuator 23" for sake of convenience), and an appropriate speed stage can be implemented by changing flow of hydraulic pressure to the engaging element 21 in response to operation of the shift actuator 23.

Figure 2:
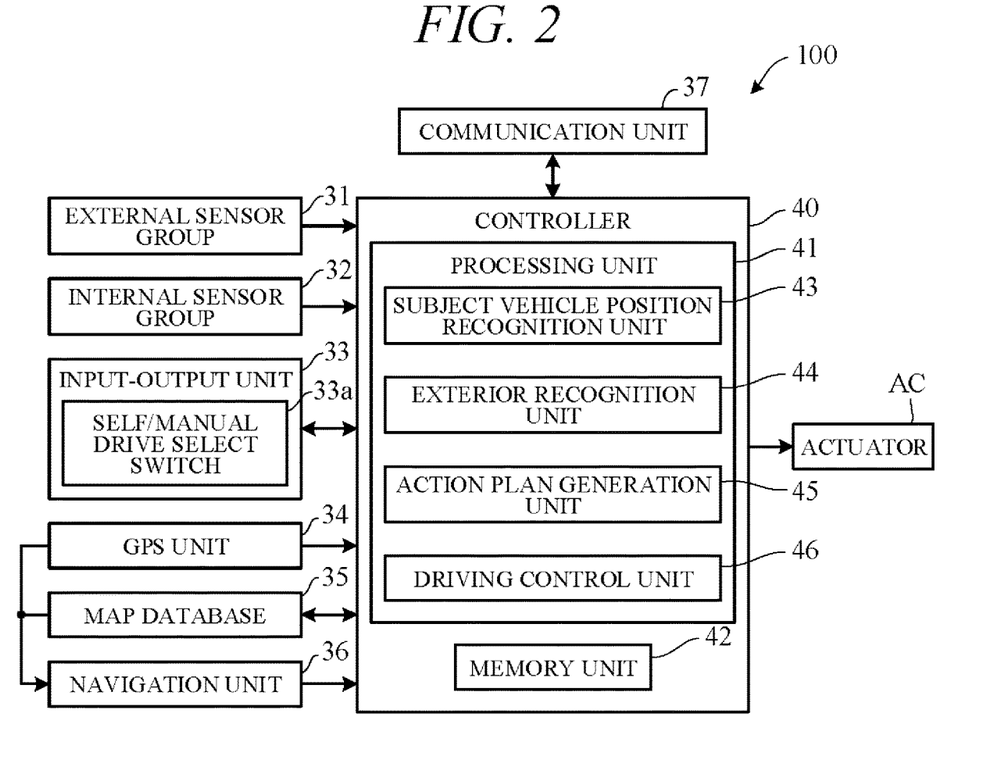
FIG. 2 is a block diagram schematically illustrating overall configuration of a vehicle control system including the vehicle travel control apparatus according to an embodiment of the present invention.

FIG. 2 is a block diagram schematically illustrating overall configuration of a vehicle control system 100 including a vehicle travel control apparatus according to an embodiment of the present invention. As shown in FIG. 2, the vehicle control system 100 includes mainly of the controller 40, and as members communicably connected with the controller 40 through CAN (Controller Area Network) communication or the like, an external sensor group 31, an internal sensor group 32, an input-output unit 33, a GPS unit 34, a map database 35, a navigation unit 36, a communication unit 37, and actuators AC.

The term external sensor group 31 herein is a collective designation encompassing multiple sensors (external sensors) for detecting external circumstances constituting subject vehicle ambience data. For example, the external sensor group 31 includes, inter alia, a LIDAR (Light Detection and Ranging) for measuring distance from the vehicle to ambient obstacles by measuring scattered light produced by laser light radiated from the subject vehicle in every direction, a RADAR (Radio Detection and Ranging) for detecting other vehicles and obstacles around the subject vehicle by radiating electromagnetic waves and detecting reflected waves, and a CCD, CMOS or other image sensor-equipped on-board cameras for imaging subject vehicle ambience (forward, reward and sideways).

The term internal sensor group 32 herein is a collective designation encompassing multiple sensors (internal sensors) for detecting subject vehicle driving state. For example, the internal sensor group 32 includes, inter alia, an engine speed sensor for detecting engine rotational speed, a vehicle speed sensor for detecting subject vehicle running speed, acceleration sensors for detecting subject vehicle forward-rearward direction acceleration and lateral acceleration, respectively, a yaw rate sensor for detecting rotation angle speed around a vertical axis through subject vehicle center of gravity, and a throttle opening sensor for detecting throttle opening angle. The internal sensor group 32 also includes sensors for detecting driver driving operations in manual drive mode, including, for example, accelerator pedal operations, brake pedal operations, steering wheel operations and the like.

The term input-output unit 33 is used herein as a collective designation encompassing apparatuses receiving instructions input by the driver and outputting information to the driver. For example, the input-output unit 33 includes, inter alia, switches which the driver uses to input various instructions, a microphone which the driver uses to input voice instructions, a display for presenting information to the driver via displayed images, and a speaker for presenting information to the driver by voice. In FIG. 2, as an example of various switches constituting the input-output unit 33, a self/manual drive select switch 33a for instructing either self-drive mode or manual drive mode are shown.

The self/manual drive select switch 33a, for example, is configured as a switch manually operable by the driver to output instructions of switching to the self-drive mode enabling self-drive functions or the manual drive mode disabling self-drive functions in response to operation thereof. Optionally, the self/manual drive select switch 33a can be configured to instruct switching from manual drive mode to self-drive mode or from self-drive mode to manual drive mode when a predetermined condition is satisfied without operating the self/manual drive select switch 33a. In other words, drive mode can be switched automatically not manually in response to automatic switching of the self/manual drive select switch 33a.

The GPS unit 34 includes a GPS receiver for receiving position determination signals from multiple GPS satellites, and measures absolute position (latitude, longitude and the like) of the subject vehicle based on the signals received from the GPS receiver.

The map database 35 is a unit storing general map data used by the navigation unit 36 and is, for example, implemented using a hard disk. The map data include road position data and road shape (curvature etc.) data, along with intersection and road branch position data. The map data stored in the map database 35 are different from high-accuracy map data stored in a memory unit 42 of the controller 40.

The navigation unit 36 retrieves target road routes to destinations input by the driver and performs guidance along selected target routes. Destination input and target route guidance is performed through the input-output unit 33. Target routes are computed based on subject vehicle current position measured by the GPS unit 34 and map data stored in the map database 35.

The communication unit 37 communicates through networks including the Internet and other wireless communication networks to access servers (not shown in the drawings) to acquire map data, traffic data and the like, periodically or at arbitrary times. Acquired map data are output to the map database 35 and/or memory unit 42 to update their stored map data. Acquired traffic data include congestion data and traffic light data including, for instance, time to change from red light to green light.

The actuators AC are provided to perform driving of the vehicle 200. The actuators AC include a throttle actuator 13 for adjusting opening angle of the throttle valve of the engine 1 (throttle opening angle), a shift actuator 23 for changing speed stage of the transmission 2, as shown in FIG. 1, and further includes a brake actuator for operating a braking device, and a steering actuator for driving a steering unit.

The controller 40 is constituted by an electronic control unit (ECU). In FIG. 2, the controller 40 is integrally configured by consolidating multiple function-differentiated ECUs such as an engine control ECU, a transmission control ECU, a clutch control ECU and so on. Optionally, these ECUs can be individually provided. The controller 40 incorporates a computer including a CPU or other processing unit (a microprocessor) 41, the memory unit (a memory) 42 of RAM, ROM, hard disk and the like, and other peripheral circuits not shown in the drawings.

The memory unit 42 stores high-accuracy detailed map data including, inter alia, lane center position data and lane boundary line data. More specifically, road data, traffic regulation data, address data, facility data, telephone number data and the like are stored as map data. The road data include data identifying roads by type such as expressway, toll road and national highway, and data on, inter alia, number of road lanes, individual lane width, road gradient, road 3D coordinate position, lane curvature, lane merge and branch point positions, and road signs. The traffic regulation data include, inter alia, data on lanes subject to traffic restriction or closure owing to construction work and the like. The memory unit 42 also stores a shift map (shift chart) serving as a shift operation reference, various programs for performing processing, and threshold values used in the programs, etc.

As functional configurations, the processing unit 41 includes a subject vehicle position recognition unit 43, an exterior recognition unit 44, an action plan generation unit 45, and a driving control unit 46.

The subject vehicle position recognition unit 43 recognizes map position of the subject vehicle (subject vehicle position) based on subject vehicle position data calculated by the GPS unit 34 and map data stored in the map database 35. Optionally, the subject vehicle position can be recognized using map data (building shape data and the like) stored in the memory unit 42 and ambience data of the vehicle 200 detected by the external sensor group 31, whereby the subject vehicle position can be recognized with high accuracy. Optionally, when the subject vehicle position can be measured by sensors installed externally on the road or by the roadside, the subject vehicle position can be recognized with high accuracy by communicating with such sensors through the communication unit 37.

The exterior recognition unit 44 recognizes external circumstances around the subject vehicle based on signals from cameras, LIDERs, RADARs and the like of the external sensor group 31. For example, it recognizes position, speed and acceleration of nearby vehicles (forward vehicle or rearward vehicle) driving in the vicinity of the subject vehicle, position of vehicles stopped or parked in the vicinity of the subject vehicle, and position and state of other objects. Other objects include traffic signs, traffic lights, road boundary and stop lines, buildings, guardrails, power poles, commercial signs, pedestrians, bicycles, and the like. Recognized states of other objects include, for example, traffic light color (red, green or yellow) and moving speed and direction of pedestrians and bicycles.

The action plan generation unit 45 generates a subject vehicle driving path (target path) from present time point to a certain time ahead based on, for example, a target route computed by the navigation unit 36, subject vehicle position recognized by the subject vehicle position recognition unit 43, and external circumstances recognized by the exterior recognition unit 44. When multiple paths are available on the target route as target path candidates, the action plan generation unit 45 selects from among them the path that optimally satisfies legal compliance, safe efficient driving and other criteria, and defines the selected path as the target path. The action plan generation unit 45 then generates an action plan matched to the generated target path. An action plan is also called "travel plan".

The action plan includes action plan data set for every unit time $\Delta t$ (e.g., 0.1 sec) between present time point and a predetermined time period T (e.g., 5 sec) ahead, i.e., includes action plan data set in association with every unit time $\Delta t$ interval. The action plan data include subject vehicle position data and vehicle state data for every unit time $\Delta t$. The position data are, for example, target point data indicating 2D coordinate position on road, and the vehicle state data are vehicle speed data indicating vehicle speed, direction data indicating subject vehicle direction, and the like. Therefore, when accelerating the subject vehicle to target vehicle speed within the predetermined time period T, the action plan includes target vehicle speed data. The vehicle state data can be determined from position data change of successive unit times $\Delta t$. Action plan is updated every unit time $\Delta t$.

The action plan generation unit 45 generates a target path by connecting position data at every unit time $\Delta t$ (for example, 0.1 sec) between present time point and predetermined time period T ahead, in time order. Further, the action plan generation unit 45 calculates acceleration (target acceleration) of sequential unit times $\Delta t$ based on vehicle speed (target vehicle speed) at target points of sequential unit times $\Delta t$ on target path. In other words, the action plan generation unit 45 calculates target vehicle speed and target acceleration. The driving control unit 46 instead of the action plan generation unit 45 can calculate target acceleration.

The action plan generation unit 45 generates various action plans corresponding to overtaking a forward vehicle, lane-changing for moving from one traffic lane to another, lane-keeping for maintaining same lane, decelerating and accelerating, etc. When generating a target path, the action plan generation unit 45 first decides a drive mode and generates the target path in line with the drive mode. When creating an action plan for lane-keeping, for example, the action plan generation unit 45 firsts decides drive mode from among modes such as cruising, overtaking, decelerating, and curve negotiating.

More specifically, the action plan generation unit 45 decides cruising mode as drive mode when no other vehicle is present ahead of the subject vehicle (no forward vehicle) and decides following mode as drive mode when a vehicle ahead is present. In following mode, the action plan generation unit 45 generates, for example, travel plan data for suitably controlling inter-vehicle distance to a forward vehicle in accordance with vehicle speed. Target inter-vehicle distance in accordance with vehicle speed is stored in the memory unit 42 in advance.

In self-drive mode, the driving control unit 46 controls the actuators AC so that the subject vehicle 200 travels along target path generated by the action plan generation unit 45. For example, the driving control unit 46 controls the throttle actuator 13, shift actuator 23, brake actuator and steering actuator so that the subject vehicle 200 passes through the target points of the unit times $\Delta t$.

More specifically, in self-drive mode, the driving control unit 46 calculates required driving force for achieving the target accelerations of the unit times $\Delta t$ calculated by the action plan generation unit 45, taking running resistance caused by road gradient and the like into account. And the actuators AC are feedback controlled to bring actual acceleration detected by the internal sensor group 32, for example, into coincidence with target acceleration. In other words, the driving control unit 46 controls the actuators AC so that the subject vehicle travels at target vehicle speed and target acceleration. On the other hand, in manual drive mode, the driving control unit 46 controls the actuators AC in accordance with driving instructions by the driver (accelerator opening angle and the like) acquired from the internal sensor group 32.

A point requiring attention in this connection is that target vehicle speed and target acceleration are preferably set taking road friction coefficient into consideration. For example, upper limit values of target vehicle speed and target acceleration are preferably held lower when running on a low friction coefficient snow-covered, icy or similar road than when running on a dry road surface. However, a driver of a vehicle running, for example, on a low friction coefficient road surface in manual drive mode is given an unusual feel when vehicle behavior changes because driving mode switches to self-drive mode and target vehicle speed or target acceleration is set higher than the vehicle speed or acceleration in manual drive mode. The vehicle travel control apparatus according to the present embodiment is configured as set out in the following in order to mitigate unusual feel of this sort.

Figure 3:
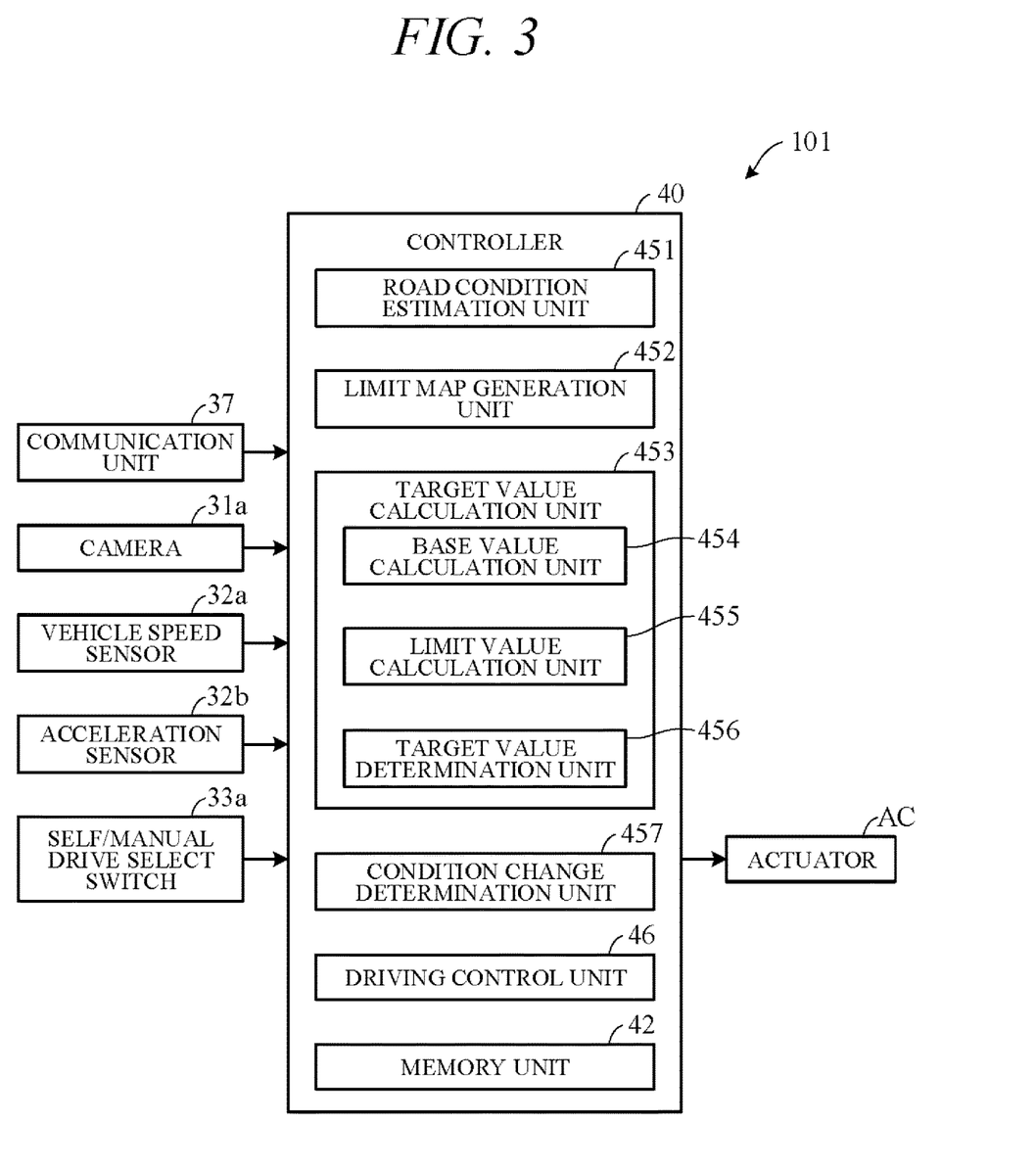
FIG. 3 is a block diagram illustrating main configuration of the vehicle travel control apparatus according to the embodiment of the present invention.

FIG. 3 is a block diagram showing essential components of a vehicle travel control apparatus 101 in accordance with an embodiment of the present invention. This block diagram shows part of FIG. 2 viewed from a different perspective from in FIG. 2. Portions the same as those of FIG. 2 are assigned the same reference symbols. As shown in FIG. 3, the controller 40 receives input signals from the communication unit 37, a camera 31a (member of the external sensor group 31), a vehicle speed sensor 32a and an acceleration sensor 32b (members of the internal sensor group 32), and the self/manual drive select switch 33a.

As functional constituents, the controller 40 includes a road condition estimation unit 451, a limit map generation unit 452, a target value calculation unit 453, a condition change determination unit 457, the driving control unit 46, and the memory unit 42. The road condition estimation unit 451, limit map generation unit 452, target value calculation unit 453, and condition change determination unit 457 are elements for generating action plans in self-drive mode, and they configure the action plan generation unit 45 of FIG. 2.

The road condition estimation unit 451 calculates road condition, more specifically, road surface estimated value $\alpha$ indicating road surface condition. Road surface estimated value $\alpha$ is a numerical value obtained by quantifying road surface slipperiness. Road surface estimated value $\alpha$ increases in proportion as road surface slipperiness increases (friction coefficient decreases). For example, road surface estimated value $\alpha$ of a dry road surface of high friction coefficient is 0 and increases progressively in order of a rain-wetted road surface, a snow-covered road surface and a frozen, ice-covered road surface.

The road condition estimation unit 451 receives road traffic data from the communication unit 37, including data on rain, snow (fresh snow, packed snow), iciness and the like, along with chains-required (traction tires-required) information, and calculates road surface estimated value $\alpha$ based on signals from the communication unit 37. Alternatively, the road condition estimation unit 451 can estimate road surface condition and calculate road surface estimated value $\alpha$ based on picture signals acquired by the camera 31a, or can determine driving force generated by the subject vehicle and presence-absence of drive wheel slipping using signals from the internal sensor group 32 and calculate road surface estimated value $\alpha$ from driving force generated by the subject vehicle when slipping occurs. In addition, multiple road surface estimated values $\alpha$ calculated by these methods can be comprehensively analyzed to decide a representative road surface estimated value $\alpha$. The communication unit 37, camera 31a, internal sensor group 32 and other detectors used to calculate road surface estimated value $\alpha$ are herein sometimes collectively termed "road surface condition detector."

Figure 4:
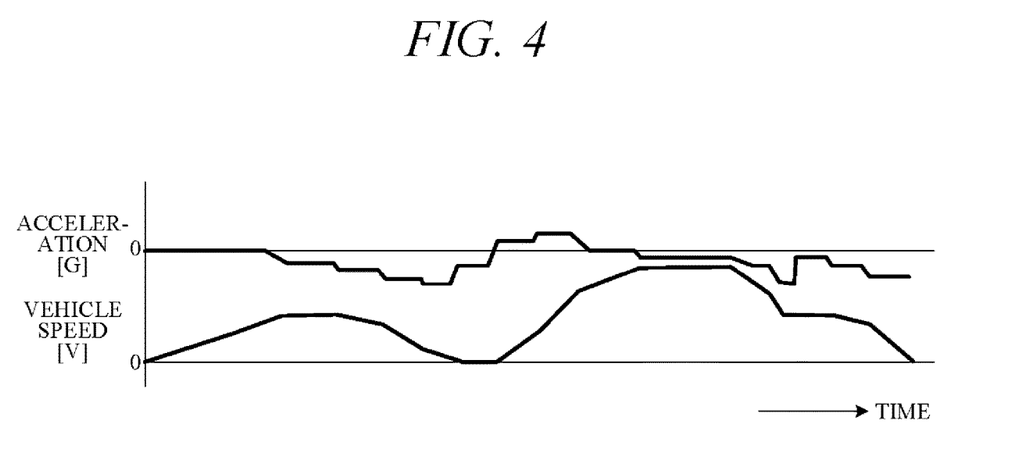
FIG. 4 is a diagram showing an example of time-course change of vehicle speed and acceleration when a vehicle travels on snow-covered road.

During manual mode driving, the limit map generation unit 452 generates a driver-specific limit map in accordance with road surface estimated value $\alpha$ based on data including vehicle speed V detected by the vehicle speed sensor 32a and acceleration G detected by the acceleration sensor 32b. FIG. 4 is a diagram showing an example of time-course change of vehicle speed V and acceleration G when road surface estimated value $\alpha$ is a certain value (e.g., snow-covered road value). As seen in FIG. 4, absolute value of acceleration G is great when vehicle speed V is in low-speed region, and absolute value of acceleration G decreases with increasing vehicle speed V.

Figure 5:
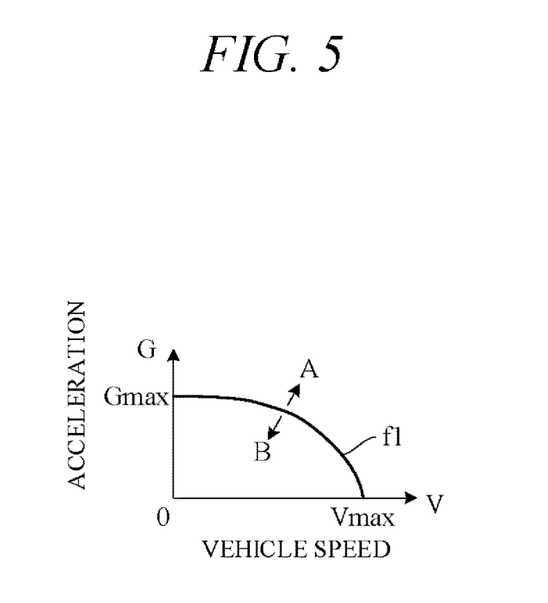
FIG. 5 is a diagram showing an example of a limit map generated by a limit map generation unit of FIG. 3.

FIG. 5 is a diagram showing an example of a limit map generated by the limit map generation unit 452. The limit map (characteristic curve f1) of FIG. 5 is determined with consideration to relation between vehicle speed V and acceleration G (absolute value) of FIG. 4. Specifically, characteristic curve f1 represents maximum acceleration G as a function of vehicle speed V or maximum vehicle speed V as a function of acceleration G. Vehicle speed V and acceleration G at individual time points in FIG. 4 therefore fall in the region inside characteristic curve f1, so that the characteristic curve f1 indicates driver drivable range (range assumable by vehicle speed V and acceleration G). According to characteristic curve f1, acceleration G is maximum (Gmax) when vehicle speed V is 0, whereafter acceleration G decreases with increasing vehicle speed V, and vehicle speed V becomes maximum value Vmax when acceleration G reaches 0.

Characteristic curve f1 indicates driver-specific characteristics representing driver driving tendencies in manual drive mode on a snow-covered road surface. In order to enable a snowy-road inexperienced driver to drive carefully, characteristic curve f1 is moved inward (e.g., in direction of arrow B) to contract driving range in terms of vehicle speed and acceleration. In contrast, for a driver well experienced with running on snow-covered roads, characteristic curve f1 is moved outward (e.g., in direction of arrow A) to expand driving range in terms of vehicle speed and acceleration. Characteristic curve f1 is altered depending on road surface condition. In case of a dry road surface, for example, characteristic curve f1 is moved outward to expand driving range. Conversely, in case of an icy road surface, characteristic curve f1 is moved inward to contract driving range. Characteristic curves f1 generated by the limit map generation unit 452 are stored in the memory unit 42.

The target value calculation unit 453 includes a base value calculation unit 454, a limit value calculation unit 455, and a target value determination unit 456. The action plan generation unit 45 generates an action plan of the subject vehicle based on surrounding circumstances of the subject vehicle detected by the external sensor group 31 and exterior recognition unit 44. At this time, the base value calculation unit 454 calculates control target values for individual unit times $\Delta t$ included in the action plan. The control target values include target vehicle speed and target acceleration when the subject vehicle travels in self-drive mode. The control target values calculated by the base value calculation unit 454 are vehicle speed and acceleration base values (base vehicle speed Va0 and base acceleration Ga0) before restriction by the limit value calculation unit 455. In other words, they are basic values based on vehicle speed and acceleration before taking driver driving tendencies (driving characteristics) and road surface conditions into account.

The limit value calculation unit 455 takes internal factors such as driver driving tendencies and external factors such as road surface condition into account to calculate settable ranges of target vehicle speed Va and target acceleration Ga in self-drive mode, i.e., to calculate limit vehicle speed and acceleration values (limit vehicle speed Va1 and limit acceleration Ga1). The limit values (first limit values) taking internal factors into account are determined by characteristic curve f1 generated by the limit map generation unit 452. On the other hand, the limit values (second limit values) taking external factors into account are upper limit value of vehicle speed V (upper limit vehicle speed Va2) and upper limit value of acceleration G (upper limit acceleration Ga2) dependent on road surface condition, and these values are calculated in accordance with characteristics of FIGS. 6A and 6B stored in the memory unit 42 in advance.

Figure 6A:
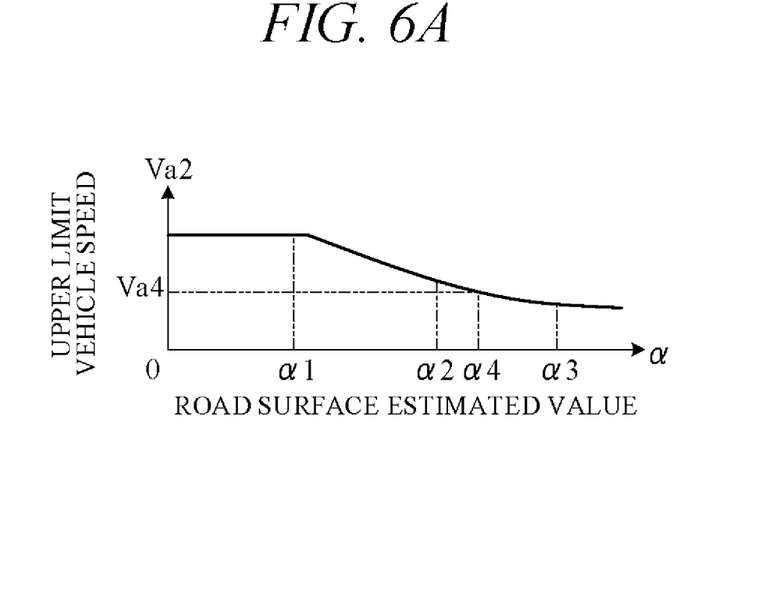
FIG. 6A is a diagram a relationship between road surface estimated value and upper limit vehicle speed stored in advance.
Figure 6B:
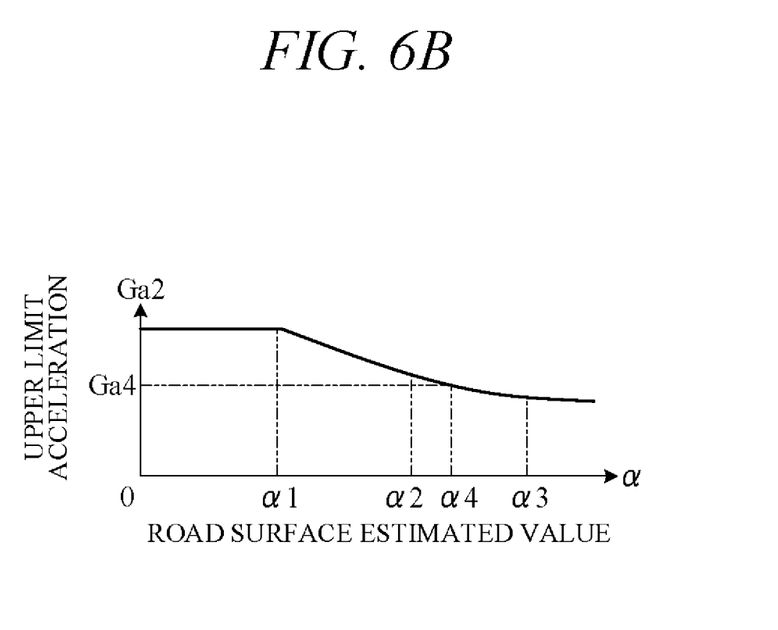
FIG. 6B is a diagram a relationship between road surface estimated value and upper limit acceleration stored in advance.

FIGS. 6A and 6B are diagrams showing relationship of upper limit vehicle speed Va2 and upper limit acceleration Ga2 as second limit values relative to road surface estimated value α. In FIGS. 6A and 6B, range of road surface estimated value α between not less than 0 and less than α1 is dry surface range, between not less than α1 and less than α2 is wet surface range (during rainfall, for example), between not less than α2 and less than α3 is snow-covered road surface range, and between not less than α3 and less than α4 is icy surface range.

As shown in FIG. 6A, upper limit vehicle speed Va2 is highest on dry road surface, and after road surface estimated value α exceeds α1 and rises to or above a predetermined value, upper limit vehicle speed Va2 decreases gradually with increasing road surface estimated value α. As shown in FIG. 6B, upper limit acceleration Ga2 is highest on dry road surface, and after road surface estimated value α exceeds α1 and rises to or above a predetermined value, upper limit acceleration Ga2 decreases gradually with increasing road surface estimated value α. The limit value calculation unit 455 applies the relationships of FIGS. 6A and 6B to calculate upper limit vehicle speed Va2 and upper limit acceleration Ga2 as second limit values. For example, when road surface estimated value α is at α4 (snow-covered road surface) between α2 and α3, upper limit vehicle speed Va2 becomes Va4 and upper limit acceleration Ga2 becomes Ga4.

The limit value calculation unit 455 calculates final limit values Va1 and Ga1 of vehicle speed and acceleration based on the second limit values (upper limit vehicle speed Va2 and upper limit acceleration Ga2) calculated with consideration to external factors in this manner and on the first limit values taking internal factors into consideration (characteristic curve f1). In other words, the limit value calculation unit 455 calculates limit vehicle speed Va1 and limit acceleration Ga1 for when manual drive mode is switched to self-drive mode giving consideration to road surface condition and driver driving behavior in manual drive mode. Namely, it calculates settable ranges of target vehicle speed Va and target acceleration Ga included in the action plan.

More specifically, the limit value calculation unit 455 determines larger-smaller relationship between the first limit values (characteristic curve f1) and the second limit values (Va2 and Ga2) and decides the smaller of the values as limit values Va1 and Ga1 of vehicle speed and acceleration. Therefore, limit vehicle speed Va1 and limit acceleration Ga1 are determined inside the characteristic curve f1 by characteristics that partition region inside V=Va2 and G=Ga2.

There now follows a detailed explanation with reference to FIGS. 7A to 7D of how limit vehicle speed Va1 and limit acceleration Ga1 change with change in driver-specific first limit values. In FIGS. 7A to 7D, differing characteristic curves f1a to f1d of the first limit values when associated road surface estimated values α are a certain value α4 (snow-covered road surface) are indicated and second limit values Va4 and Ga4 of the snow-covered road are indicated by point P4.

Figure 7A:
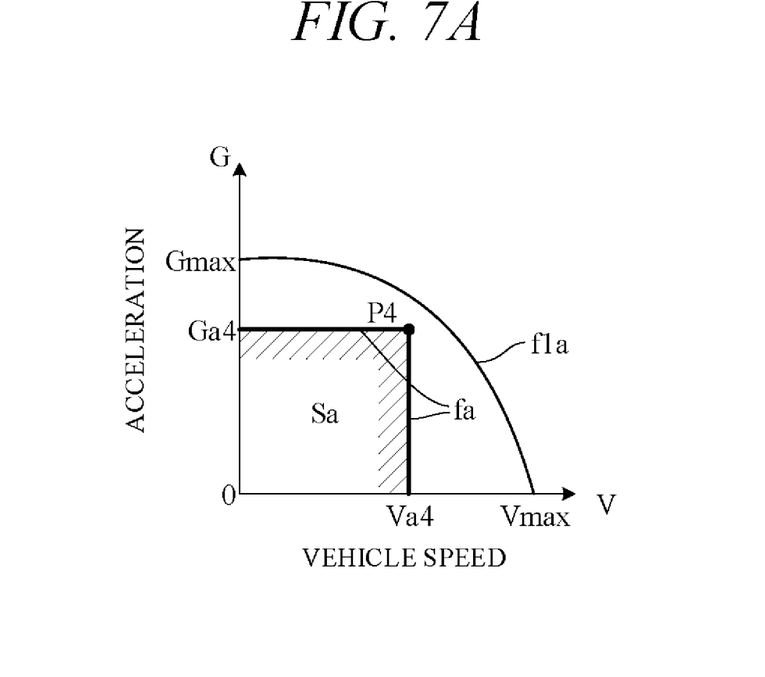
FIG. 7A is a diagram showing a first example of limit values of vehicle speed and acceleration calculated by a target value calculation unit of FIG. 3.

As shown in FIG. 7A, when point P4 is inside characteristic curve f1a, hatched region Sa partitioned by V=Va4 and G=Ga4 is settable range of target vehicle speed Va and target acceleration Ga. Each point on characteristic curve fa obtained by connecting V=Va4 and G=Ga4 is therefore limit vehicle speed Va1 and limit acceleration Ga1.

Figure 7B:
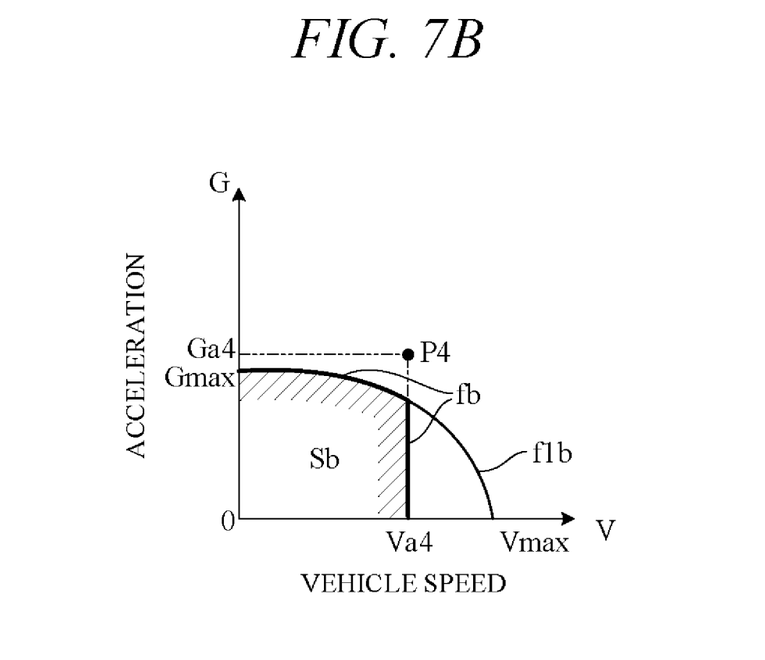
FIG. 7B is a diagram showing a second example of limit values of vehicle speed and acceleration calculated by a target value calculation unit of FIG. 3.

In FIG. 7B, a characteristic curve f1b whose maximum acceleration Gmax is smaller than that of FIG. 7A is shown, and point P4 is outside characteristic curve f1b (Ga4>Gmax). In this case, as shown in FIG. 7B, provided that Va4<Vmax, hatched region Sb partitioned by V=Va4 and characteristic curve f1b is settable range of target vehicle speed Va and target acceleration Ga. Each point on characteristic curve fb obtained by connecting V=Va4 and characteristic curve f1b is therefore limit vehicle speed Va1 and limit acceleration Ga1.

Figure 7C:
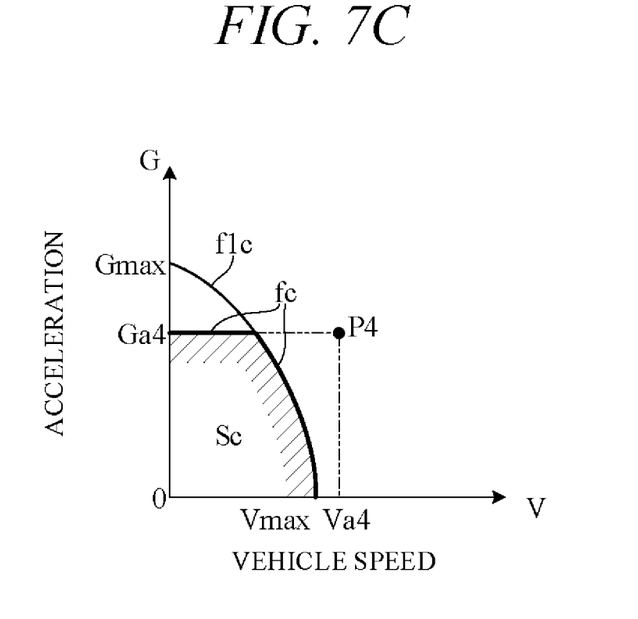
FIG. 7C is a diagram showing a third example of limit values of vehicle speed and acceleration calculated by a target value calculation unit of FIG. 3.

In FIG. 7C, a characteristic curve f1c whose maximum speed Vmax is smaller than that of FIG. 7A is shown, and point P4 is outside characteristic curve f1c (Va4>Vmax). In this case, as shown in FIG. 7C, provided that Ga4<Gmax, hatched region Sc partitioned by G=Ga4 and characteristic curve f1c is settable range of target vehicle speed Va and target acceleration Ga. Each point on characteristic curve fc obtained by connecting G=Ga4 and characteristic curve f1c is therefore limit vehicle speed Va1 and limit acceleration Ga1.

Figure 7D:
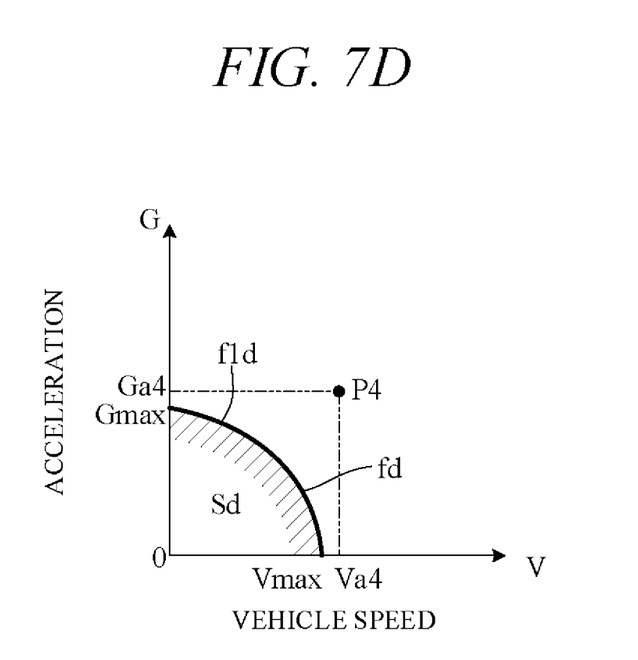
FIG. 7D is a diagram showing a fourth example of limit values of vehicle speed and acceleration calculated by a target value calculation unit of FIG. 3.

In FIG. 7D, a characteristic curve f1d whose maximum speed Vmax and maximum acceleration Gmax are smaller than those of FIG. 7A is shown, and point P4 is outside characteristic curve f1d (Va4>Vmax, Ga4>Gmax). In this case, hatched region Sd partitioned by characteristic curve f1d is settable range of target vehicle speed Va and target acceleration Ga. Each point on characteristic curve f1d (characteristic curve fd) is therefore limit vehicle speed Va1 and limit acceleration Ga1.

The target value determination unit 456 decides target vehicle speed Va and target acceleration Ga of every unit time Δt included in action plan. Specifically, the target value determination unit 456 determines whether base vehicle speed Va0 calculated by the base value calculation unit 454 is equal to or less than limit vehicle speed Va1 calculated by the limit value calculation unit 455 and whether base acceleration Ga0 calculated by the base value calculation unit 454 is equal to or less than limit acceleration Ga1 calculated by the limit value calculation unit 455. When base vehicle speed Va0 is equal to or less than limit vehicle speed Va1 and base acceleration Ga0 is equal to or less than limit acceleration Ga1, the target value determination unit 456 decides base vehicle speed Va0 as target vehicle speed Va and base acceleration Ga0 as target acceleration Ga.

On the other hand, when base vehicle speed Va0 exceeds limit vehicle speed Va1, the target value determination unit 456 restricts target vehicle speed Va using limit vehicle speed Va1. For example, it decides limit vehicle speed Va1 as target vehicle speed Va. Moreover, when base acceleration Ga0 exceeds limit acceleration Ga1, the target value determination unit 456 restricts target acceleration Ga using limit acceleration Ga1. For example, it decides limit acceleration Ga1 as target acceleration Ga. In other words, the target value determination unit 456 decides (selects) target vehicle speed Va and target acceleration Ga from within hatched regions Sa to Sd of FIGS. 7A to 7D.

The condition change determination unit 457 responds to switching of driving mode from manual drive mode to self-drive mode by determining from road surface conditions whether change in current road conditions has occurred. This is done by determining whether upper limit vehicle speed Va2 (FIG. 6A) and/or upper limit acceleration Ga2 (FIG. 6B) dependent on road surface conditions is changed by or greater than predetermined value. The limit value calculation unit 455 responds to change of road surface estimated value $\alpha$ by changing limit vehicle speed Va1 and limit acceleration Ga1 based on characteristics of FIGS. 6A and 6B. Then when the condition change determination unit 457 determines that upper limit vehicle speed Va2 and upper limit acceleration Ga2 are changed by or greater than predetermined value owing to change in road surface conditions, the limit value calculation unit 455 changes limit vehicle speed Va1 and limit acceleration Ga1 to upper limit vehicle speed Va2 and upper limit acceleration Ga2 calculated based on road surface conditions, without taking driver driving tendencies during manual driving (characteristic curves f1 a to f1 d of FIGS. 7A to 7D) into consideration. The target value determination unit 456 decides target vehicle speed Va and target acceleration Ga so that target vehicle speed Va and target acceleration Ga are restricted by limit values Va1 and Ga1 calculated after change of road surface conditions.

The driving control unit 46 outputs control signals to the actuators AC so as to control subject vehicle speed V and acceleration G to target vehicle speed Va and target acceleration Ga decided by the target value determination unit 456.

Figure 8:
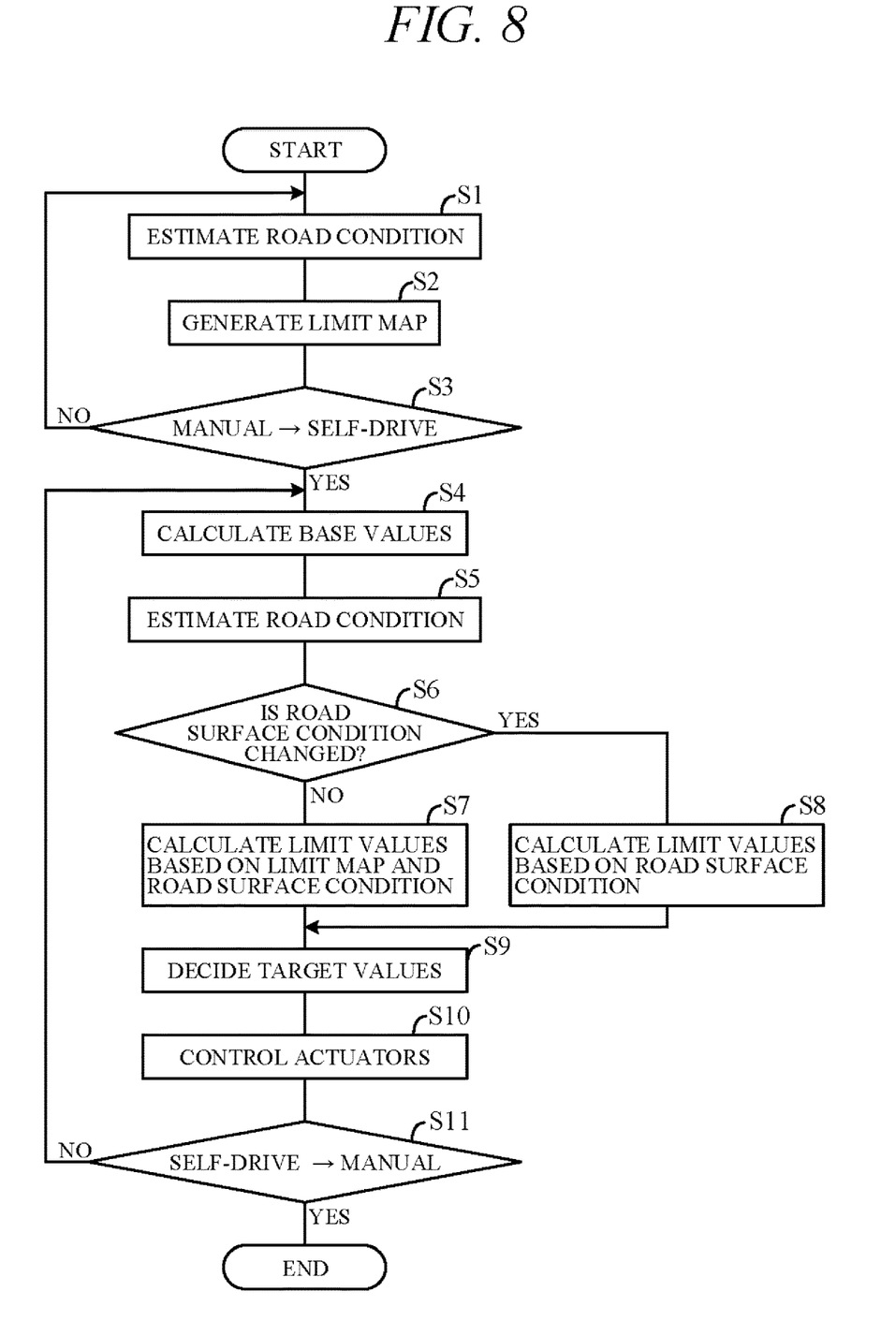
FIG. 8 is a flow chart showing an example of processing performed by a controller of FIG. 5.

FIG. 8 is a flowchart showing an example of processing performed by the controller 40 (CPU) of FIG. 3 in accordance with a program stored in the memory unit 42 in advance. The processing of this flowchart is started, for example, upon driving mode switching to manual drive mode.

First, in S1 (S: processing Step), the road condition estimation unit 451 estimates road conditions based on road traffic data acquired from the communication unit 37, road surface picture signals acquired from the camera 31*a*, and presence-absence of drive wheel slipping. Actually, the road condition estimation unit 451 calculates road surface estimated value $\alpha$ representing road surface condition. Next, in S2, the limit map generation unit 452 uses data on vehicle speed V detected by the vehicle speed sensor 32*a* and acceleration G detected by the acceleration sensor 32*b* in manual drive mode to generate and store in the memory unit 42 a limit map representing driver-specific driving characteristics (characteristic curve f1 of FIG. 5).

Next, in S3, whether switching from manual drive mode to self-drive mode is instructed by an instruction from the self/manual drive select switch 33*a* is determined. If a positive decision is made in S3, the routine proceeds to S4, and if a negative decision is made returns to S1. In S4, base vehicle speed Va0 and base acceleration Ga0 serving as base values of the control target values (target vehicle speed Va and target acceleration Ga) are calculated based on surrounding circumstances of the subject vehicle detected by the external sensor group 31 and the exterior recognition unit 44.

Next, in S5, similarly to in S1, the road condition estimation unit 451 estimates road conditions. In S6, the condition change determination unit 457 determines whether road surface condition is changed with respect to when driving mode has been switched from manual drive mode to self-drive mode, namely, determines whether road surface condition (road surface estimated value $\alpha$) is changed between road condition estimated in S1 and road condition estimated in S5 to an extent that changes upper limit vehicle speed Va2 and/or upper limit acceleration Ga2 by or greater than predetermined value.

If a negative decision is made in S6, the routine proceeds to S7, in which the limit value calculation unit 455 calculates limit vehicle speed Va1 and limit acceleration Ga1 based on a limit map and road surface condition (see FIGS. 7A to 7D). Namely, larger-smaller relationship between characteristic curve f1 representing the limit map stored in the memory unit 42 (first limit values) and upper limit vehicle speed Va2 and upper limit acceleration Ga2 corresponding to road surface condition estimated in S5 (second limit values) is determined, and limit vehicle speed Va1 and limit acceleration Ga1 are calculated.

On the other hand, if a positive decision is made in S6, the routine proceeds to S8, in which the limit value calculation unit 455 calculates limit vehicle speed Va1 and limit acceleration Ga1 based on road surface condition. Driver driving characteristics corresponding to road surface condition differing from current road surface condition are stored in the memory unit 42. Since driving characteristics corresponding to different road surface condition need not be taken into consideration, upper limit vehicle speed Va2 and upper limit acceleration Ga2 (second limit values) corresponding to road surface condition estimated in S5 are calculated in S8 as limit vehicle speed Va1 and limit acceleration Ga1 without using driving characteristics (first limit values) stored in memory.

In S9, the target value determination unit 456 restricts base vehicle speed Va0 and base acceleration Ga0 calculated in S4 using limit values Va1 and Ga1 calculated in S7 or limit values Va1 and Ga1 calculated in S8 and decides the target values (target vehicle speed Va and target acceleration Ga) accordingly. Next, in S10, the driving control unit 46 outputs control signals to the actuators AC in accordance with target vehicle speed Va and target acceleration Ga. Next, in S11, whether switching from self-drive mode to manual drive mode is instructed by an instruction from the self/manual drive select switch 33*a* is determined. If a negative decision is made in S11, the routine returns to S4, and if a positive decision is made, the routine is terminated.

Main operation of the vehicle travel control apparatus 101 according to the present embodiment is more concretely explained in the following. When the vehicle 200 is running in manual drive mode on a snow-covered road, for example, driver-specific driving characteristics (characteristic curve f1) indicating changes in vehicle speed V and acceleration G are stored in the memory unit 42 (S2). When driving mode thereafter switches from manual drive mode to self-drive mode, target vehicle speed Va and target acceleration Ga during self-drive mode are restricted using limit vehicle speed Va1 and limit acceleration Ga1 calculated in accordance with driver driving characteristics and road surface condition (S7 and S9). As divergence between behavior of the vehicle 200 in manual driving and behavior of the vehicle 200 in self-driving is therefore small, the driver's feeling of unusualness is mitigated.

Of particular significance is that, as indicated by the characteristic curves f1a to f1d of FIGS. 7A to 7D, driver driving characteristics vary greatly, so limit values Va1 and Ga1 of target vehicle speed Va and target acceleration Ga are established taking individual driver driving characteristics into consideration. Since behavioral change of the vehicle 200 when driving mode changes from manual drive mode to self-drive mode is therefore small, odd sensation experienced by the driver is favorably diminished.

When during traveling in self-drive mode, road surface condition changes from snow-covered road surface to dry road surfaces, for example, target vehicle speed Va and target acceleration Ga during self-driving are restricted using limit vehicle speed Va1 (upper limit vehicle speed Va2) and limit acceleration Ga1 (upper limit vehicle speed Ga2) calculated in accordance with road surface condition (S8 and S9). Therefore, when road surface condition changes, target vehicle speed Va and target acceleration Ga are restricted based solely on road surface condition after change of the road condition without taking driver driving characteristics before the change into consideration. As a result, good self-driving can be performed without restricting target vehicle speed Va and target acceleration Ga more than necessary.

The present embodiment can achieve advantages and effects such as the following:

(1) The vehicle travel control apparatus 101 is configured to control traveling activity (travel behavior) of the vehicle 200 capable of traveling in self-drive mode with self-driving capability enabled and manual drive mode with self-driving capability disabled. The apparatus includes: the action plan generation unit 45 for generating an action plan including target path of the vehicle 200; the driving control unit 46 for controlling actuators AC so that the vehicle 200 travels by self-driving in accordance with the action plan generated by the action plan generation unit 45; a road surface condition detector configured by, inter alia, the communication unit 37 and camera 31*a*, for detecting road surface condition; the memory unit 42 for storing driver driving characteristics during traveling in manual drive mode; and the self/manual drive select switch 33*a* for instructing mode switching from manual drive mode to self-drive mode (FIGS. 2 and 3). The action plan generation unit 45 includes the target value calculation unit 453 (limit value calculation unit 455 and target value determination unit 456) responsive to instruction by the self/manual drive select switch 33*a* to switch from manual drive mode to self-drive mode, for restricting control target values (target vehicle speed Va and target acceleration Ga) of the vehicle 200 included in the action plan based on road surface condition detected by the road surface condition detection unit and driving characteristics stored in the memory unit 42 (FIG. 3).

Owing to this configuration, control target values are restricted not only in accordance with road surface condition but also in accordance with driver-specific driving characteristics during manual driving. As a result, the driver's feeling of unusualness can be mitigated because change in vehicle 200 behavior when driving mode switches from manual drive mode to self-drive mode is minimized.

(2) The control target values include target vehicle speed and acceleration values (target vehicle speed Va and target acceleration Ga). Driving characteristics stored in the memory unit 42 are those of the characteristic curve f1 representing region of vehicle speed and acceleration change during manual drive mode (FIG. 5). The target value calculation unit 453 (limit value calculation unit 455 and target value determination unit 456) restrict target vehicle speed Va and target acceleration Ga in accordance with road surface condition detected by the road surface condition detector and also restrict target vehicle speed Va and target acceleration Ga using driving characteristics. Since target vehicle speed Va and target acceleration Ga included in the action plan can therefore be set to optimum values, self-driving free of any odd feel for a driver can be optimally performed.

(3) The target value calculation unit 453 is responsive to detection of a first road surface condition (e.g., snow-covered road surface) by the road surface condition detector when switching from manual drive mode to self-drive mode is instructed by the self/manual drive select switch 33*a*, for restricting the control target values (target vehicle speed Va and target acceleration Ga) based on the first road surface condition and driving characteristics stored in the memory unit 42. When the road surface condition detector thereafter detects change from the first road surface condition to a second road surface condition (e.g., dry road surface), the target value calculation unit 453 restricts the control target values (target vehicle speed Va and target acceleration Ga) based on the second road surface condition. Therefore, good self-driving can be performed because the control target values (target vehicle speed Va and target acceleration Ga) are not limited more than necessary.

Various modifications of the aforesaid embodiment are possible. Some examples are explained in the following. In the aforesaid embodiment, vehicle speed and acceleration are defined as control target values during self-driving, but a target value needs not be limited to these. For example, target value of inter-vehicle distance to vehicle ahead during vehicle following can be defined as a target value. In this case also, similarly to in the case of restricting target vehicle speed Va and target acceleration Ga in accordance with road surface condition and driver driving characteristics, inter-vehicle distance target value is preferably restricted in accordance with road surface condition and driver driving characteristics. This aspect is explained in the following.

Figure 9:
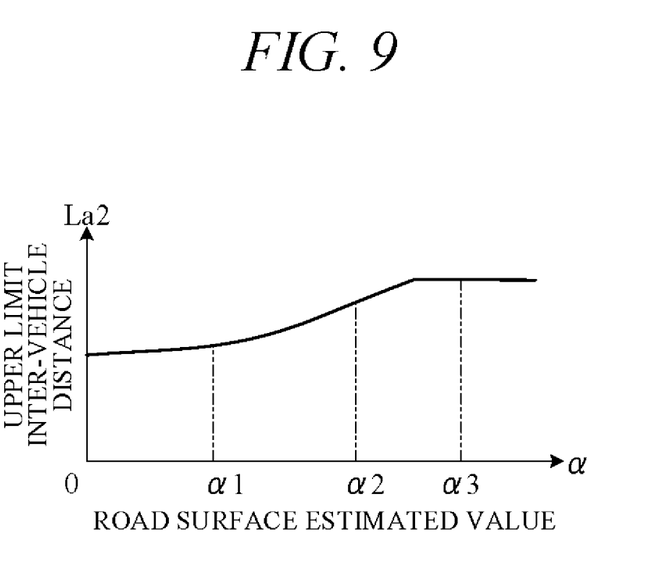
FIG. 9 is a diagram a relationship between road surface estimated value and upper limit inter-vehicle distance stored in advance.

FIG. 9 is diagram showing relationship between road surface estimated value $\alpha$ and upper limit value of target inter-vehicle distance La (upper limit target inter-vehicle distance La2). This relationship is stored in the memory unit 42 beforehand. As shown in FIG. 9, upper limit target inter-vehicle distance La2 is shorter in proportion as road surface estimated value $\alpha$ is lower and increases gradually with increasing road surface estimated value $\alpha$. The base value calculation unit 454 calculates a base value of the target inter-vehicle distance La (base target inter-vehicle distance La0) based on an action plan generated by the action plan generation unit 45. The limit value calculation unit 455 uses FIG. 9 to calculate an upper limit inter-vehicle distance La2 in accordance with road surface condition. The target value determination unit 456 restricts base target inter-vehicle distance La0 calculated by the base value calculation unit 454 using upper limit inter-vehicle distance La2 to decide target inter-vehicle distance La. The driving control unit 46 controls actuators AC so that inter-vehicle distance assumes target inter-vehicle distance La.

Since the target value calculation unit 453 in this way restricts inter-vehicle distance target value (target inter-vehicle distance La) in accordance with road surface condition detected by the road surface condition detector, inter-vehicle distance can be appropriately set in accordance with road surface condition. Therefore, good vehicle following can be performed during self-driving.

In the aforesaid embodiment, road surface condition is detected based on traffic data from the communication unit 37, picture signals from the camera 31a, and slip data from the internal sensor group 32, but a road surface condition detector is not limited to this configuration. In the aforesaid embodiment, when switching from manual drive mode to self-drive mode is instructed by the self/manual drive select switch 33a (a drive mode instruction switch), limit values of control target values (target vehicle speed and target acceleration) are calculated in the limit value calculation unit 455 based road surface condition detected by the road surface condition detector and driving characteristics stored in the memory unit 42, and the target value determination unit 456 restricts target values using these limit values. However, an action plan restriction unit is not limited to this configuration insofar as adapted to restrict target values of the vehicle included in the action plan.

The present invention can also be used as a vehicle travel control method configured to control a travel behavior of a vehicle capable of traveling in a self-drive mode with a self-drive capability enabled and in a manual drive mode with the self-drive capability disabled.

The above embodiment can be combined as desired with one or more of the above modifications. The modifications can also be combined with one another.

According to the present invention, driver's feeling of unusualness can be mitigated because change in a vehicle behavior when driving mode switches from manual drive mode to self-drive mode is minimized.

Above, while the present invention has been described with reference to the preferred embodiments thereof, it will be understood, by those skilled in the art, that various changes and modifications may be made thereto without departing from the scope of the appended claims.

What is claimed is:

1. A vehicle travel control apparatus configured to control a travel behavior of a vehicle including an actuator for traveling, the vehicle being configured to travel in a self-drive mode with a self-drive capability enabled and in a manual drive mode with the self-drive capability disabled, the vehicle travel control apparatus comprising:
   a road surface condition detector configured to detect a road surface condition;
   a drive mode instruction switch configured to instruct the manual drive mode or the self-drive mode; and
   an electric control unit having a microprocessor and a memory, wherein
   the memory is configured to store a driving characteristic of a driver during traveling in the self-drive mode, and
   the microprocessor is configured to perform:
   generating an action plan including a target path of the vehicle;
   controlling the actuator so that the vehicle travels in self-driving in accordance with the action plan generated in the generating,
   the generating including restricting a target value of a physical quantity for traveling of the vehicle included in the action plan, based on the road surface condition detected by the road surface condition detector and the driving characteristic stored in the memory, in the self-drive mode after a switching from the manual drive mode to the self-drive mode is instructed by the drive mode instruction switch, and
   the restricting including, in the self-drive mode after the switching, restricting the target value based on the driving characteristic stored in the memory and a first road surface condition detected by the road surface condition detector at a time when the switching is instructed, and thereafter, when a change from the first road surface condition to a second road surface condition is detected by the road surface condition detector, restricting the target value based on the second road surface condition without using the driving characteristic stored in the memory.

2. The apparatus according to claim 1, wherein
the target value includes a vehicle speed target value and an acceleration target value,
the driving characteristic stored in the memory includes driving characteristics representing changes of vehicle speed and acceleration acquired during traveling in the manual drive mode, and
the microprocessor is configured to perform
the restricting including, in the self-drive mode after the switching from the manual drive mode to the self-drive mode, restricting the vehicle speed target value and the acceleration target value in accordance with the driving characteristic stored in the memory and the first road surface condition until the change from the first road surface condition to the second road surface condition is detected by the road surface condition detector.

3. The apparatus according to claim 2, wherein
the microprocessor is configured to perform
the restricting including, in the self-drive mode after the switching from the manual drive mode to the self-drive mode, calculating first limit values of the vehicle speed and the acceleration in accordance with the driving characteristics and second limit values of the vehicle speed and the acceleration in accordance with the first road surface condition, and restricting the vehicle speed target value and the acceleration target value by a smaller one of the first limit values and the second limit values until the change from the first road surface condition to the second road surface condition is detected by the road surface condition detector.

4. The apparatus according to claim 3, wherein
the target value further includes an inter-vehicle distance target value between the vehicle and another vehicle ahead, and
the microprocessor is configured to perform
the restricting including restricting the inter-vehicle distance target value in accordance with the road surface condition detected by the road surface condition detector.

5. The apparatus according to claim 3, wherein
the microprocessor is configured to perform
the restricting including determining, when the second limit values changes by or greater than a predetermined value, that the change from the first road surface condition to the second road surface condition is detected by the road surface condition detector, and thereafter restricting the target value based on the second road surface condition without using the driving characteristic stored in the memory.

6. The apparatus according to claim 3, wherein
the microprocessor is configured to perform
the restricting including calculating a road surface estimated value indicating the road surface condition detected by the road surface condition detector and restricting the vehicle speed target value and the acceleration target value in accordance with the road surface estimated value calculated,
the road surface estimated value is a numerical value obtained by quantifying a road surface slipperiness, and the calculating the road surface estimated value including calculating the road surface estimated value based on a driving force of the vehicle and a presence or absence of drive wheel slipping of the vehicle.

7. The apparatus according to claim 2, wherein
the microprocessor is configured to perform
the restricting including, in the self-drive mode after the switching from the manual drive mode to the self-drive mode, restricting the vehicle speed target value and the acceleration target value in accordance with the second road surface condition without using the driving characteristic stored in the memory after the change from the first road surface condition to the second road surface condition detected by the road surface condition detector.

8. The apparatus according to claim 1, wherein:
the driving characteristic includes a characteristic intrinsic to a driver representing a relationship of a maximum acceleration relative to the vehicle speed, corresponding to the road surface condition detected by the road surface condition detector, the relationship determined based on the vehicle speed and the acceleration acquired under the road surface condition detected by the road surface condition detector during traveling in the manual drive mode.

9. A vehicle travel control method configured to control a travel behavior of a vehicle including an actuator for traveling, the vehicle being configured to travel in a self-drive mode with a self-drive capability enabled and in a manual drive mode with the self-drive capability disabled,
the vehicle travel control method comprising:
detecting a road surface condition;
instructing the manual drive mode or the self-drive mode;
generating an action plan including a target path of the vehicle;
controlling the actuator so that the vehicle travels in self-driving in accordance with the action plan;
storing a driving characteristic of a driver during traveling in the self-drive mode in a memory, wherein
the generating includes restricting a target value of a physical quantity for traveling of the vehicle included in the action plan, based on the road surface condition detected in the detecting and the driving characteristic stored in the memory, in the self-drive mode after a switching from the manual drive mode to the self-drive mode when the switching is instructed, and
the restricting including, in the self-drive mode after the switching, restricting the target value based on the driving characteristic stored in the memory and a first road surface condition detected in the detecting at a time when the switching is instructed, and thereafter when a change from the first road surface condition to a second road surface condition is detected in the detecting, restricting the target value based on the second road surface condition without using the driving characteristic stored in the memory.

10. The method according to claim 9, wherein
the target value includes a vehicle speed target value and an acceleration target value,
the driving characteristic stored in the memory includes driving characteristics representing changes of vehicle speed and acceleration acquired during traveling in the manual drive mode, and
the restricting includes, in the self-drive mode after the switching from the manual drive mode to the self-drive mode, restricting the vehicle speed target value and the acceleration target value in accordance with the driving characteristic stored in the memory and the first road surface condition until the change from the first road surface condition to the second road surface condition is detected in the detecting.

11. The method according to claim 10, wherein
the restricting includes calculating first limit values of the vehicle speed and the acceleration in accordance with the driving characteristics and second limit values of the vehicle speed and the acceleration in accordance with the first road surface condition, and restricting the vehicle speed target value and the acceleration target value by a smaller one of the first limit values and the second limit values until the change from the first road surface condition to the second road surface condition is detected in the detecting.

12. The method according to claim 11, wherein
the restricting including determining, when the second limit values changes by or greater than a predetermined value, that the change from the first road surface condition to the second road surface condition is detected in the detecting detector, and thereafter restricting the target value based on the second road surface condition without using the driving characteristic stored in the memory.

13. The method according to claim 11, wherein
the restricting including calculating a road surface estimated value indicating the road surface condition detected in the detecting and restricting the vehicle speed target value and the acceleration target value in accordance with the road surface estimated value calculated,
the road surface estimated value is a numerical value obtained by quantifying a road surface slipperiness, and
the calculating the road surface estimated value including calculating the road surface estimated value based on a driving force of the vehicle and a presence or absence of drive wheel slipping of the vehicle.

14. The method according to claim 10, wherein
the target value further includes an inter-vehicle distance target value between the vehicle and another vehicle ahead, and
the restricting includes restricting the inter-vehicle distance target value in accordance with the road surface condition detected in the detecting.

15. The method according to claim 10, wherein
the restricting including, in the self-drive mode after the switching from the manual drive mode to the self-drive mode, restricting the vehicle speed target value and the acceleration target value in accordance with the second road surface condition without using the driving characteristic stored in the memory after the change from the first road surface condition to the second road surface condition is detected in the detecting.

16. The method according to claim 9, wherein
the driving characteristic includes a characteristic intrinsic to a driver representing a relationship of a maximum acceleration relative to the vehicle speed, corresponding to the road surface condition detected in the detecting, the relationship determined based on the vehicle speed and the acceleration acquired under the road surface condition detected in the detecting during traveling in the manual drive mode.

* * * * *